(12) United States Patent
Coffinberry

(10) Patent No.: US 6,578,362 B1
(45) Date of Patent: Jun. 17, 2003

(54) METHODS AND APPARATUS FOR SUPPLYING COOLING AIR TO TURBINE ENGINES

(75) Inventor: George Albert Coffinberry, West Chester, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/567,241

(22) Filed: May 11, 2000

Related U.S. Application Data

(60) Provisional application No. 60/134,525, filed on May 17, 1999.

(51) Int. Cl.$^7$ .............................. F02C 7/12; F02C 7/16; F02C 7/224
(52) U.S. Cl. ............................ 60/782; 60/730; 60/736; 60/806
(58) Field of Search ................. 60/226.1, 736, 60/39.07, 39.75, 39.83, 730, 806, 782, 785, 805

(56) References Cited

U.S. PATENT DOCUMENTS

| | | | | |
|---|---|---|---|---|
| 2,970,437 A | * | 2/1961 | Anderson | 60/39.83 |
| 2,979,293 A | * | 4/1961 | Mount | 60/736 |
| 3,038,308 A | * | 6/1962 | Fuller | 60/736 |
| 3,974,642 A | * | 8/1976 | Pacault | 60/736 |
| 4,187,675 A | * | 2/1980 | Wakeman | 60/39.75 |
| 4,773,212 A | * | 9/1988 | Griffin et al. | 60/226.1 |
| 5,267,608 A | * | 12/1993 | Coffinberry | 165/70 |
| 5,297,386 A | * | 3/1994 | Kervistin | 60/226.1 |
| 5,317,877 A | * | 6/1994 | Stuart | 60/736 |
| 5,729,969 A | * | 3/1998 | Porte | 60/39.07 |
| 5,782,076 A | * | 7/1998 | Huber et al. | 60/736 |
| 6,035,627 A | * | 3/2000 | Liu | 60/39.07 |
| 6,050,080 A | | 4/2000 | Horner | |
| 6,065,282 A | | 5/2000 | Fukue et al. | |
| 6,253,554 B1 | | 7/2001 | Kobayashi et al. | |
| 6,295,803 B1 | | 10/2001 | Bancalari | |

FOREIGN PATENT DOCUMENTS

| GB | 2072268 | * | 9/1981 | 60/736 |
|---|---|---|---|---|

OTHER PUBLICATIONS

Roth, G.L. et al, "How to use fuel as a heat sink," Mar. 1960, Space–Aeronautics, pp. 56–60.*

* cited by examiner

*Primary Examiner*—Ted Kim
(74) *Attorney, Agent, or Firm*—Rodney M. Young; Armstrong Teasdale LLP

(57) ABSTRACT

A cooling air cooling system operable to reduce fuel gum deposits within the cooling system when a gas turbine engine operates above a predefined percentage of rated engine power. The cooling system includes a recirculating loop including a plurality of heat exchanges in fluid communication with the recirculating loop. A first head exchange uses heat transfer fluid to cool cooling air used by the gas turbine engine. A second head exchange is a fluid-fuel head exchanger that uses combustor main fuel flow to cool the head transfer fluid circulating in the recirculating loop.

17 Claims, 3 Drawing Sheets

METHODS AND APPARATUS FOR SUPPLYING COOLING AIR TO TURBINE ENGINES

CROSS REFERENCE TO RELATED APPLICATION

This application claims the benefit of U.S. Provisional Application No. 60/134,525, filed May 17, 1999.

GOVERNMENT RIGHTS STATEMENT

The United States Government has rights in this invention pursuant to Contract No. F33657-85-C-0256.

BACKGROUND OF THE INVENTION

This invention relates generally to turbine engines, and, more particularly, to cooling systems for turbine engines.

A gas turbine engine typically includes a multi-stage axial or centrifugal compressor, a combustor, and a turbine. Airflow entering the compressor is compressed and directed to the combustor where it is mixed with fuel and ignited, producing hot combustion gases used to drive the turbine. As a result of the hot combustion gases entering the turbine, compressor air may be channeled through a turbine cooling circuit and used to cool the turbine.

Compressor bleed may be extracted through a cooling system and used as a source of cooling air for the turbine cooling circuit. However, extracting large amounts of cooling air from the compressor may affect overall gas turbine engine performance. To minimize a reduction in engine performance, the cooling system may use fuel flowing through a heat exchanger to absorb heat from the compressor bleed air, but the use of fuel as a heat sink causes potential fire safety and fuel deposit problems. As hot compressor bleed air passes through the heat exchanger, fuel flow absorbs heat from the compressor bleed air.

However, as fuel is heated, often carbon, gum, and coke deposits form within tubing used to transport fuel through the heat exchanger. Over time, such deposit agglomeration blocks individual tube passages causing an increase in cooling air temperature. Because of the increased cooling air temperature, less heat is absorbed from compressor bleed air and turbine components receiving compressor bleed air are cooled ineffectively. As a result, such components are subjected to increased low cycle fatigue, LCF, stresses and increased thermal stresses. Furthermore, because turbine components are cooled less effectively, overall engine performance, life, and reliability decreases.

BRIEF SUMMARY OF THE INVENTION

In an exemplary embodiment, a selectively operable cooling system reduces fuel gum deposits within the cooling system to a gas turbine engine when the gas turbine engine is operated above a predefined percentage of engine rated power. The cooling system includes a recirculating loop including a plurality of heat exchangers in fluid communication with the recirculating loop. A first heat exchanger is an air-fluid heat exchanger that uses heat transfer fluid to cool cooling air supplied to the gas turbine engine. A second heat exchanger is a fluid-fuel heat exchanger that uses combustor main fuel flow to cool the heat transfer fluid circulating in the recirculating loop.

During gas turbine engine operation above a predefined percentage of engine rated power, the cooling system is placed in operation when sufficient deposit dissipation forces are available within the second heat exchanger. Fuel passing through the second heat exchanger flows through fuel paths to facilitate heat transfer from the heat transfer fluid to the fuel. As a result of the flow through the fuel paths, the fuel flow develops high fluid turbulent forces and fluid shear forces. Such fluid forces reduce fuel deposits within the second heat exchanger.

DETAILED DESCRIPTION OF THE INVENTION

Figure 1:
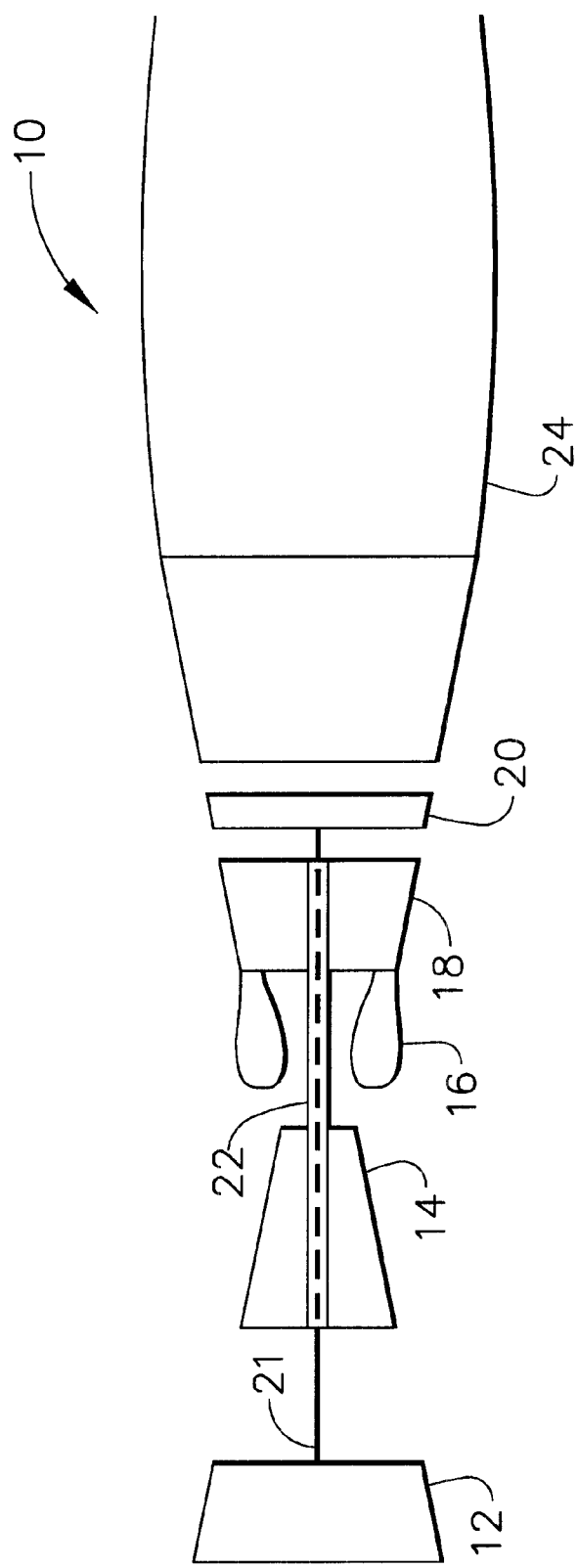
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Combustor 16 is a conventional or low emissions combustor. Compressor 12 and turbine 20 are coupled by a first shaft 21, and compressor 14 and turbine 18 are coupled by a second shaft 22. In one embodiment, a load (not shown) is also coupled to gas turbine engine 10 with first shaft 21. In one embodiment, gas turbine engine 10 is an aero-derivative land-marine engine such as the LM 2500 or LM 6000 commercially available from General Electric Aircraft Engines, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
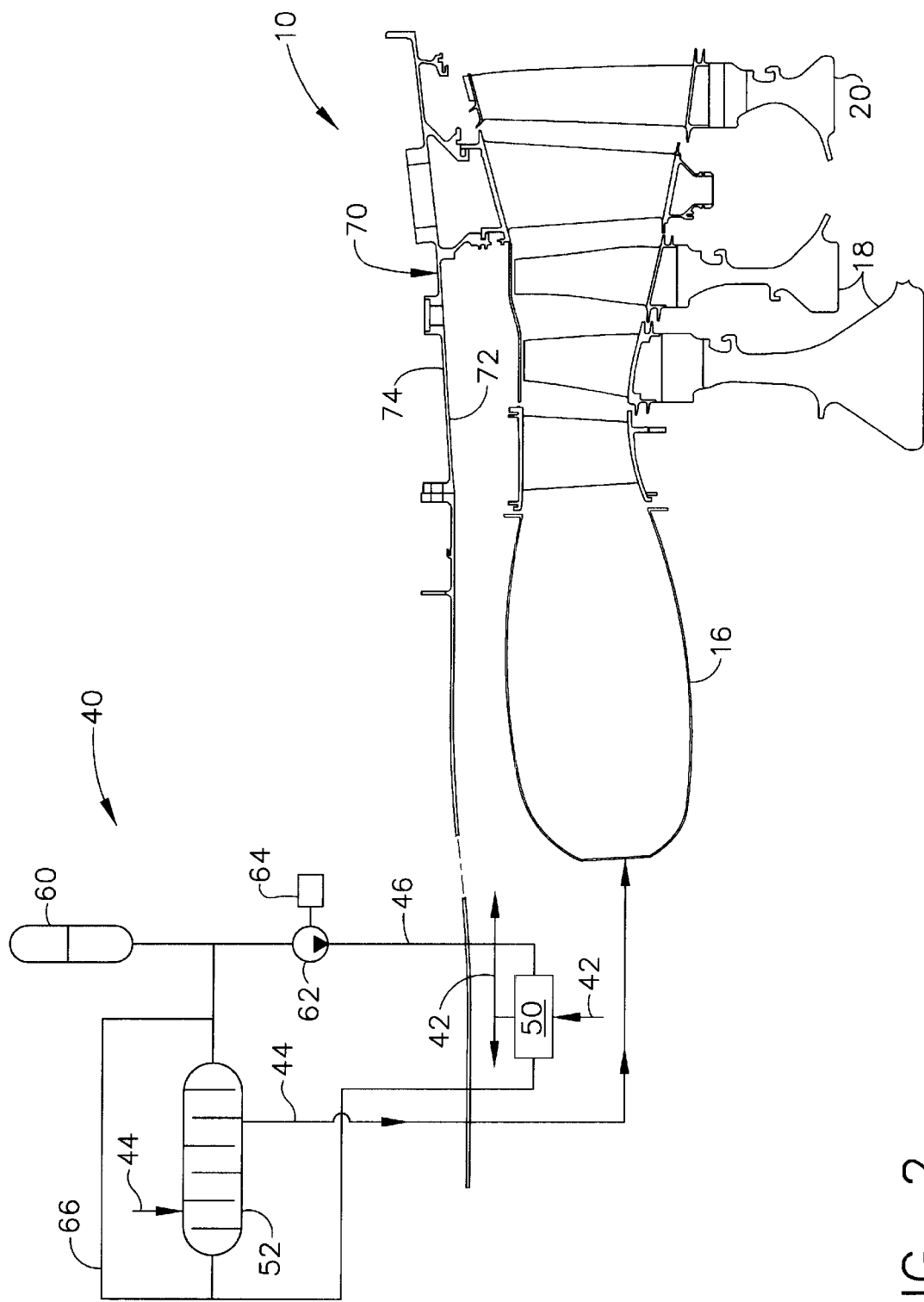
FIG. 2 is schematic illustration of a cooling system used with the gas turbine engine shown in FIG. 1.

FIG. 2 is schematic illustration of a cooling system 40 for use with gas turbine engine 10. Cooling system 40 is an indirect cooling system (ICS) that is selectively operable and uses compressor bleed air 42 for cooling air to turbines 18 and 20. Combustor fuel flow 44 or fan discharge air (not shown) are used as heat sinks to cool combustor discharge bleed air 42. In one embodiment, cooling system 40 is fabricated and sized such that system 40 weighs less than 65 pounds.

Recirculating loop 46 is a closed loop and includes a first heat exchanger 50 and a second heat exchanger 52. Because recirculating loop 46 is a closed loop, no make-up water is used. First heat exchanger 50 is an air-fluid heat exchanger that transfers heat from compressor bleed air 42 to a suitable heat transfer fluid circulated in recirculating loop 46. In one embodiment, the heat transfer fluid is a water and methanol mix wherein the water is pure de-ionized laboratory grade water and the methanol inhibits the heat transfer fluid from freezing when gas turbine engine 10 is inoperative and when the heat transfer fluid is not circulating. In an exemplary embodiment, the heat transfer fluid is a solution containing approximately 0.222 moles methanol and 0.778 moles water and has a freezing temperature of approximately −40° F. Buffer compounds may be added to recirculating loop 46 to adjust the water chemistry and prevent corrosion within recirculating loop 46. In another embodiment, the fuel passages of heat exchanger 52 are coated with a chemical vapor deposition metal oxide coating to aid in the release of gum and coke deposits, and to prevent fuel deposits from forming.

Fluid exiting first heat exchanger 50 is routed directly to second heat exchanger 52. The term "fluid", as used herein, refers to a single phase super critical fluid or gas where fluid temperature exceeds a critical temperature of the fluid at a specified pressure above a critical pressure of the heat transfer fluid and no phase change exists, or a single-phase super critical liquid below the critical temperature of the fluid at a specified pressure above the critical pressure of the heat transfer fluid and no phase change exists. Second heat exchanger 52 is a fluid-fuel heat exchanger that transfers heat from the heat transfer fluid to main combustor fuel flow 44 supplied to combustor 16. Main combustor fuel flow 44 is a heat sink that absorbs heat from the heat transfer fluid to return the heat transfer fluid from a gaseous or vaporous form to a liquid form. Second heat exchanger 52 includes a first passageway (not shown) and a second passageway (not shown). The first passageway includes a plurality of tubes (not shown) that permit heat transfer fluid to flow from first heat exchanger 50 through second heat exchanger 52. The second passageway permits main combustor fuel flow 44 to flow through second heat exchanger 52 and around the plurality of tubes. The plurality of tubes are closely-spaced and define a large number of fuel passes that extend through second heat exchanger 52. As main combustor fuel flow 44 flows around the tubes through the closely-spaced fuel passages, fluid turbulent forces and fluid shear forces develop. Furthermore, as a result of fluid turbulent forces and fluid shear forces, a Reynolds number for the heat transfer fluid increases. The increased Reynolds number and the fluid forces permit the fluid to mitigate deposit fragments formed on outside surfaces (not shown) of the tubes. Such fragments are easily separated from the tubes and mixed with main combustor fuel flow 44. Accordingly, deposit agglomeration and blockage within the tubes is reduced.

Recirculating loop 46 also includes an accumulator 60 and a pump 62. Accumulator 60 is a gaseous-nitrogen charged accumulator that maintains system pressure of cooling system 40. Alternatively, recirculating loop 46 includes a pressure regulator (not shown). Accumulator 60 derives thermal energy from recirculating loop 46 as described in more detail below. In one embodiment, accumulator 60 is fabricated from a composite material and includes an aluminum-bronze piston. Pump 62 is a variable-speed recirculation pump that adjusts system pressure within recirculating loop 46. Pump 62 is coupled to a motor 64 that includes an electronic control (not shown). In one embodiment, motor 64 is an electric motor. The pump electronic control is electrically coupled to an engine control system (not shown). In one embodiment, the pump electronic control is electrically coupled to an engine control system known as a full authority digital electronic control (FADEC) available from General Electric Aircraft Engines, Cincinnati, Ohio.

The pump electronic control regulates energization of pump 62 and also regulates operation of a bypass valve (not shown). The bypass valve controls a flow of heat transfer fluid flow through a bypass 66. Bypass 66 works in combination with pump electronic control to regulate energization of pump 62 and to permit heat transfer fluid flow to bypass second heat exchanger 52 during gas turbine engine start-up operations. Thus, the pump electronic control regulates the pressure and cooling capacity of recirculating loop 46.

Gas turbine engine 10 includes an engine core casing 70 that includes an internal surface 72 and an external surface 74. Casing 70 extends circumferentially around compressor 14, combustor 16, and turbines 18 and 20. First heat exchanger 50 is mounted to casing internal surface 72 and extends into an engine cooling air flow path (not shown). Accordingly, first heat exchanger 50 does not include any air ducts for routing air to and from first heat exchanger. Engine performance is not adversely affected by first heat exchanger 50 because a pressure drop of the cooling air passing through first heat exchanger 50 is relatively low. Second heat exchanger 52 is mounted to casing external surface 74.

During start-up operations of gas turbine engine 10, sufficient fuel deposit dissipation forces are not present and cooling system 40 is not operated. During such operating conditions, heat transfer fluid within recirculating loop 46 is not circulated and fuel is supplied through second heat exchanger 52 at a reduced flow rate demanded by engine 10 during reduced-power operations when cooling of bleed air 42 is not needed.

At low power operations, operating temperatures of engine 10 are relatively low in comparison to operating temperatures of engine 10 at increased power operations. During such engine operations, compressor bleed air 42 exiting compressor 14 (shown in FIG. 1) has a sufficient temperature to cool engine 10 while passing through first heat exchanger 50 and not cooled by cooling system 40. Accordingly, because cooling system 40 is selectively operable, cooling system 40 is not used unless sufficient deposit dissipation forces are available. Furthermore, because system 40 is not operated during low operating power levels where cooling air is not demanded by engine 10, fuel deposit formations are further reduced.

Because separate heat exchangers 50 and 52 are used for air and fuel, second heat exchanger 52 is optimized for a high deposit dissipation rate while first heat exchanger 50 is optimized for low cooling air pressure drop. Specifically, second heat exchanger 52 is optimized to develop high fuel Reynolds numbers to increase fuel shear stresses. During high fuel flow operations, fuel shear stresses mitigate any gum deposits attached to the second heat exchanger tubes. In one embodiment, deposit dissipation stress is estimated as the pressure loss over a tube row times an effective cross-sectional area divided by a tube surface area.

Initially accumulator 60 is charged to approximately 275 psia. As engine power increases from idle power operations to a predefined percentage of rated engine power of gas turbine engine 10, cooling system 40 is placed in operation and heat transfer fluid within first heat exchanger 50 boils. As the heat transfer fluid boils, accumulator 60 uses changes in heat transfer fluid density to increase in pressure to approximately 800 psia. Accumulator 60 is self-pressurizing depending on a pressure of the heat transfer fluid. During and after engine start-up operations, pump 62 maintains recirculating loop pressure.

When an operating speed of engine 10 is increased above a predefined percentage of the rated engine power, heat transfer fluid circulating in cooling system 40 is circulated at a regulated pressure. The regulated flow of heat transfer fluid ensures adequate heat transfer occurs within first and second heat exchangers 50 and 52, respectively. The combination of the regulated heat transfer fluid flow and the fluid forces generated within second heat exchanger 52 reduces fuel gum deposits when the gas turbine engine is operating above a predefined percentage of the rated engine power. As a result, deposit fragments formed on the outside surfaces (not shown) of the tubes are easily separated from the tube surfaces and mixed with main combustor fuel flow 44. When system 40 is shutoff, fuel in second heat exchanger 52 receives no heat input and therefore is not subject to overheating during low engine power operations nor from post-engine shutdown hot soak-back. Main combustor fuel flow 44 continues to flow through and cool second heat exchanger 52. Accordingly, hot soak-back problems are minimized and fuel deposit formations are further reduced.

The pressure of recirculating loop 46 is regulated such that if a leak occurs within cooling system 40, only a limited amount of heat transfer fluid escapes before the pressure drops to a level where leakage can no longer occur. When the engine control senses a loss in recirculating loop pressure, the engine control provides a throttle limit to enable engine 10 to operate in a power regime where cooling air is not required. Furthermore, fire hazards are reduced because the mixture of methanol and water flowing within recirculating loop 46 is not combustible under ordinary engine operating conditions and because second heat exchanger 52 is mounted externally to engine casing 70. Specifically, the water and methanol has only a narrow range between lower and upper flammability limits. As a result, if a fuel leak develops within second heat exchanger 52, fuel is not introduced into engine 10, but rather remains external to engine 10 because second heat exchanger 52 is mounted externally to engine 10.

Figure 3:
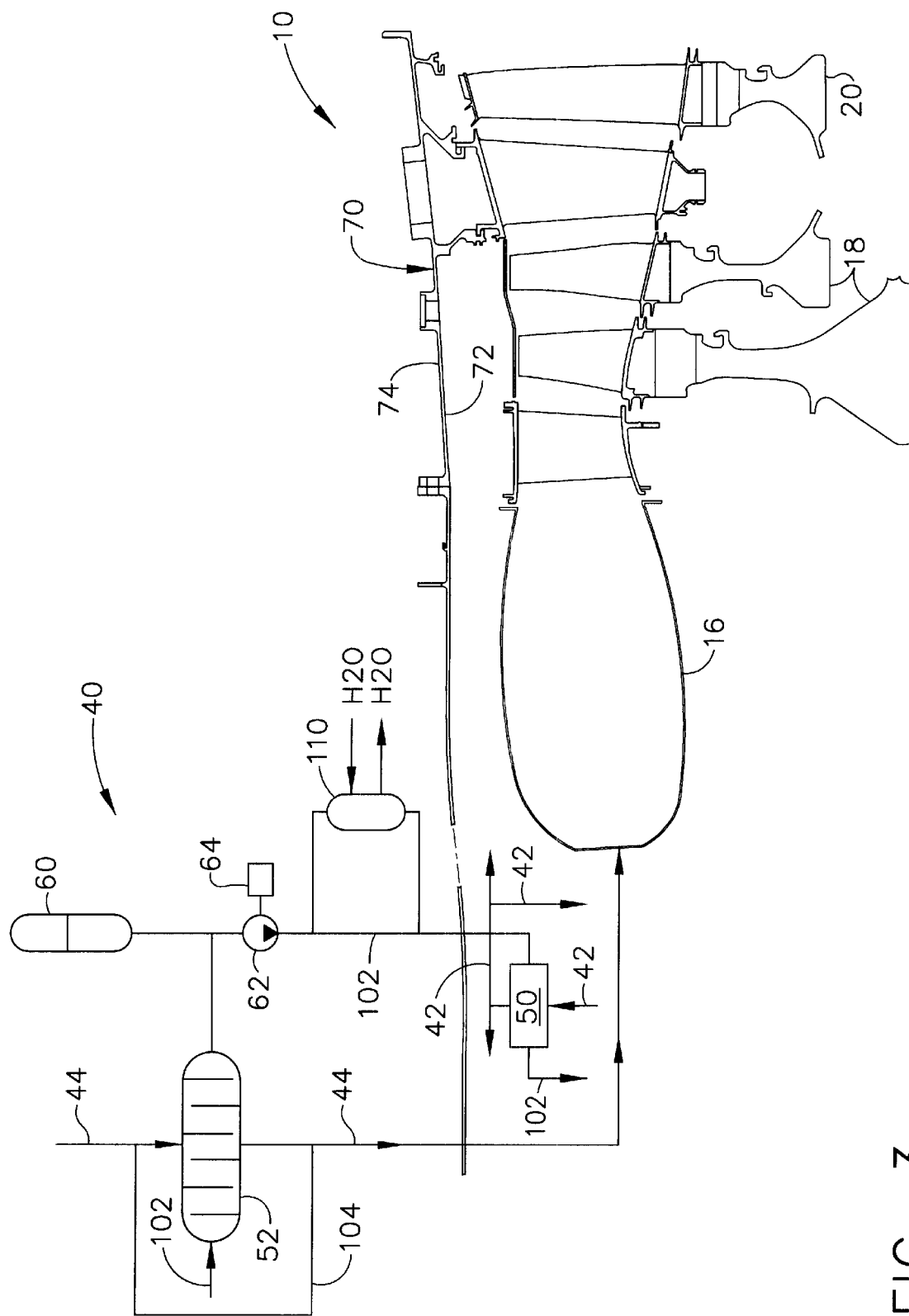
FIG. 3 is a schematic illustration of an alternative embodiment of a cooling system used with the gas turbine engine shown in FIG. 1.

FIG. 3 is a schematic illustration of a cooling system 100 for use with gas turbine engine 10. In one embodiment, cooling system 100 is utilized with ground-based engines 10. Cooling system 100 is similar to cooling system 40 (shown in FIG. 2) and includes heat exchangers 50 and 52, accumulator 60, pump 62, bypass 66, and motor 64. Cooling system 100 also includes a closed recirculating loop 102 that is similar to recirculating loop 46 (shown in FIG. 2), and also permitting closed-loop fluid cooling of various components, i.e., combustor 16, turbine 18, or turbine 20, of gas turbine engine 10. Fluid exiting first heat exchanger 50 is not routed directly to second heat exchanger 52 within recirculating loop 102. Rather, fluid exiting first heat exchanger 50 is directed to various components of gas turbine engine 10 to provide a combination of air and fluid to cool gas turbine engine 10. The fluid is directed over various gas turbine engine components and returned to second heat exchanger 52.

Recirculating loop 100 also includes an additional heat exchanger 110. Heat exchanger 110 is a fluid-water heat exchanger used when gas turbine engine 10 utilizes natural gas fuel. When pressurized for use, a temperature of the natural gas increases to an increased temperature such that heat transfer within second heat exchanger 52 is inhibited. During such operations, second heat exchanger 52 is not used and heat exchanger 110 is used. Because heat exchanger 110 is a fluid-water exchanger, water is used as a heat sink to absorb enough heat from the heat transfer fluid to convert the heat transfer fluid from a gaseous or vaporous form to a liquid.

The above-described cooling system is cost-effective and highly reliable. The cooling system reduces fuel gum deposits within the cooling system and provides cooling air to the gas turbine engine. The system is selectively operable and used when the gas turbine engine is operated above a predefined percentage of rated engine power. Although main fuel flow is used as a heat sink, the cooling system prevents deleterious high temperature fuel deposits from forming within the heat exchanger.

While the invention has been described in terms of various specific embodiments, those skilled in the art will recognize that the invention can be practiced with modification within the spirit and scope of the claims.

What is claimed is:

1. A method for supplying cooling air to a gas turbine engine including an engine core casing using a cooling system in flow communication with the gas turbine engine, the cooling system including a recirculating loop that includes a plurality of heat exchangers in fluid communication, said method comprising the steps of:

circulating fluid through the recirculating loop;

directing fluid through at least one heat exchanger including a plurality of passageways defined by and between a plurality of tubes closely-spaced to facilitate increasing a Reynolds number of the fluid flowing through the passageways for reducing fuel gum deposit formation within the at least one heat exchanger when the engine is operated above a predefined percentage of rated engine power, wherein at least one heat exchanger is mounted to an internal surface of the engine core casing, and at least one heat exchanger is mounted to an external surface of the engine core casing;

passing air through at least one of the plurality of heat exchangers to cool the air prior to directing the air to the gas turbine engine; and passing fuel through at least one of the plurality of heat exchangers to heat the fuel prior to directing the fuel to the gas turbine engine.

2. A method in accordance with claim 1 wherein, said step of passing air through at least one of the plurality of heat exchangers further comprising the step of passing air through an air-fluid heat exchanger to cool air supplied to the turbine.

3. A method in accordance with claim 1 wherein, said step of passing fuel through at least one of the plurality of heat exchangers further comprising the step of passing fuel through a fluid-fuel heat exchanger to heat fuel supplied to the combustor.

4. A method in accordance with claim 1 wherein, said step of circulating fluid through the recirculating loop further comprising the steps of:

circulating fluid through the at least one heat exchanger mounted internally to the engine core casing; and circulating fluid through the at least one heat exchanger mounted externally to the engine core casing.

5. A cooling system for a gas turbine engine including an engine core casing having internal and external surfaces, said cooling system comprising a recirculating loop comprising a plurality of heat exchangers in fluid communication, at least one of said heat exchangers comprising a plurality of passageways defined by and between a plurality of tubes closely-spaced and configured to induce turbidity in fluid circulating within said cooling system to facilitate increasing a Reynolds number of the fluid flowing through the passageways for reducing fuel gum deposit formation caused by fuel flowing through said at least one beat exchanger when the gas turbine engine is operating above a predefined percentage of rated engine a power first heat exchanger mounted to the engine core casing internal surface, a second heat exchanger mounted to the gas turbine engine core casing external surface.

6. A cooling system in accordance with claim 5 wherein said first heat exchanger is an air-fluid heat exchanger, said second heat exchanger is a fluid-fuel heat exchanger.

7. A cooling system in accordance with claim 5 wherein a water and methanol mixture is circulated within said recirculating loop.

8. A cooling system in accordance with claim 5 wherein said recirculating loop further comprises a pressurizing accumulator configured to derive thermal energy from said recirculating loop for pressurization.

9. A cooling system in accordance with claim 5 wherein said recirculating loop further comprises a variable-speed recirculation pump.

10. A cooling system in accordance with claim 5 wherein said recirculating loop is selectively operable during gas turbine engine operations under a predefined percentage of the rated engine power.

11. A gas turbine engine comprising:

a combustor;

a turbine downstream from and in flow communication with said combustor;

an engine core casing disposed circumferentially around said combustor and said turbine, said engine core casing comprising an external surface and an internal surface; and a cooling system in flow communication with said combustor and said turbine, said cooling system comprising a recirculating loop comprising a plurality of heat exchangers in fluid communication, at least one of said heat exchangers comprising a plurality of passageways defined by and between a plurality of tubes closely-spaced and configured to induce turbidity in fluid circulating within said cooling system and through the passageways to facilitate increasing a Reynolds number of the fluid for reducing fuel gum deposit formation caused by fuel flowing through said heat exchanger when said gas turbine engine is operating above a predefined percentage of rated engine power, a first heat exchanger mounted to said engine core casing internal surface, a second heat exchanger mounted to said engine core casing external surface.

12. A gas turbine engine in accordance with claim 11 wherein, said first head exchanger in flow communication with said turbine, said second heat exchanger in flow communication with said combustor.

13. A gas turbine engine in accordance with claim 12 wherein said first beat exchanger is an air-fluid heat exchanger configured to cool air supplied to said turbine, said second heat exchanger is a fluid-fuel heat exchanger configured to heat fuel supplied to said combustor.

14. A gas turbine engine in accordance with claim 12 wherein said cooling system recirculating loop further comprises a variable-speed recirculation pump.

15. A gas turbine engine in accordance with claim 12 wherein said cooling system recirculating loop further comprises a pressurizing accumulator configured to derive thermal energy from said recirculating loop to pressurize.

16. A gas turbine engine in accordance with claim 12 wherein a water and methanol mixture is circulated within said recirculating loop.

17. A gas turbine engine in accordance with claim 12 wherein said recirculating loop is selectively operable during gas turbine engine operations under a predefined percentage of rated engine power.

* * * * *

UNITED STATES PATENT AND TRADEMARK OFFICE
CERTIFICATE OF CORRECTION

PATENT NO. : 6,578,362 B1
DATED : June 17, 2003
INVENTOR(S) : George Albert Coffinberry It is certified that error appears in the above-identified patent and that said Letters Patent is hereby corrected as shown below:

Column 6,
Lines 27 and 32, delete "wherein, said step" insert therefor-- wherein said step --.
Line 55, delete "beat" insert therefor -- heat --.
Line 56, delete "a power first" insert therefor -- power, a first --.

Column 8,
Line 6, delete "wherein, said first head exchanger" insert therefor-- wherein said first heat exchanger --.
Line 10, delete "beat exchanger" insert therefor -- heat exchanger --.

Signed and Sealed this

Sixteenth Day of September, 2003

JAMES E. ROGAN
*Director of the United States Patent and Trademark Office*